Dec. 4, 1956 L. W. PARKER 2,773,239
ELECTRICAL INDICATING INSTRUMENTS
Filed May 14, 1952 2 Sheets-Sheet 1

INVENTOR
Louis W. Parker

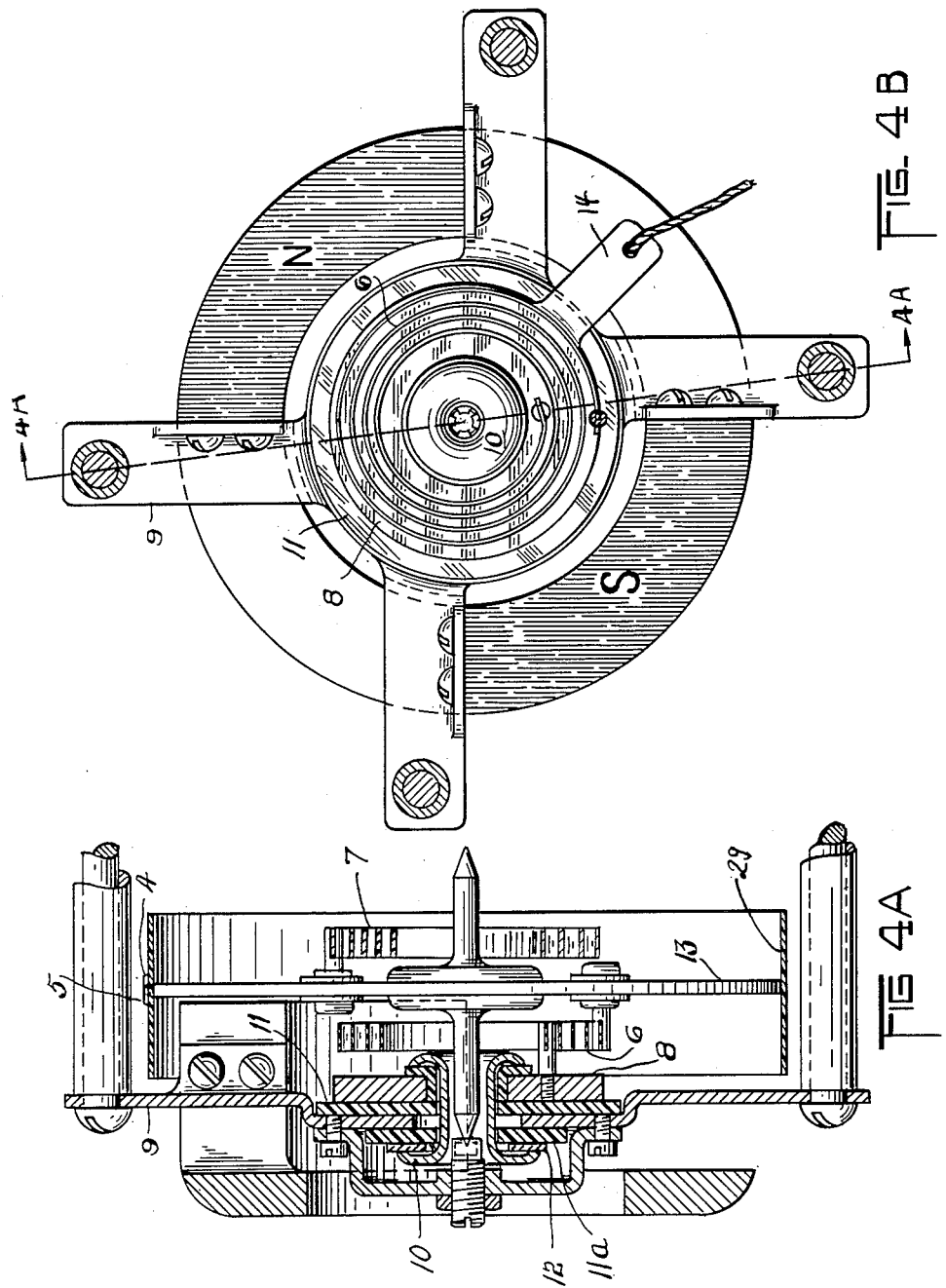

United States Patent Office 2,773,239
Patented Dec. 4, 1956

2,773,239

ELECTRICAL INDICATING INSTRUMENTS

Louis W. Parker, Great Neck, N. Y.

Application May 14, 1952, Serial No. 287,704

18 Claims. (Cl. 324—150)

This invention relates to electrical instruments, and more particularly to measuring instruments of the moving coil type.

This invention has as one object, the provision of a simple and rugged electrical indicating instrument of the moving coil type.

Another object of the invention is to provide a moving coil instrument that is less affected by heat, humidity and other variables, than other inexpensive instruments of the moving coil type.

Still another object of this invention is to provide a moving coil instrument that will withstand serious overloads without damage.

An important object of the invention resides in the provision of a plurality of instruments having closely adjacent parallel scales whereby a number of readings of different electrical values may be displayed in a small area.

Yet another object of the invention is to provide a plurality of measuring instruments which occupy a small space. Still another object of the invention is to provide an inexpensive moving coil measuring instrument.

Other objects and advantages of the invention will appear as this description proceeds.

In carrying out the foregoing objects I employ a very thin aluminum disc having thin insulating coatings on both faces thereof. Two coils are wound on each face of the coated disc. The coils are so wound that the upper front and the lower rear faces of the disc are polarized "north," and the upper rear and the lower front faces are polarized "south," when current flows through the coils. Permanent magnets pass flux through the disc beyond the areas where the coils are located, and therefore the disc tends to rotate in order to align the coils with the flux produced by the magnets.

An important feature of the invention resides in employing the technique of "printed circuits" which is well known in the art of radio receivers. The coils are printed on the coated faces of the disc thus providing numerous improvements with lower cost.

While I am describing the details of my invention in the specification it is to be understood that the invention is broader than the details herein set forth. Therefore the scope of the invention is set forth in the appended claims.

In the drawings:

Figure 4A is a sectional view taken along line 4A—4A of Figure 4B, but with the magnet removed.

Figure 4B is a sectional view of the instrument, with the rotating disc one magnet and one hairspring removed.

Figure 1:
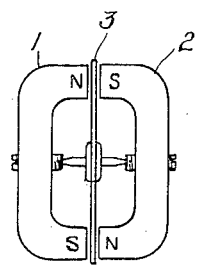
Figure 1 is a plan view illustrating certain principles of the invention.
Figures 2A, 2B:
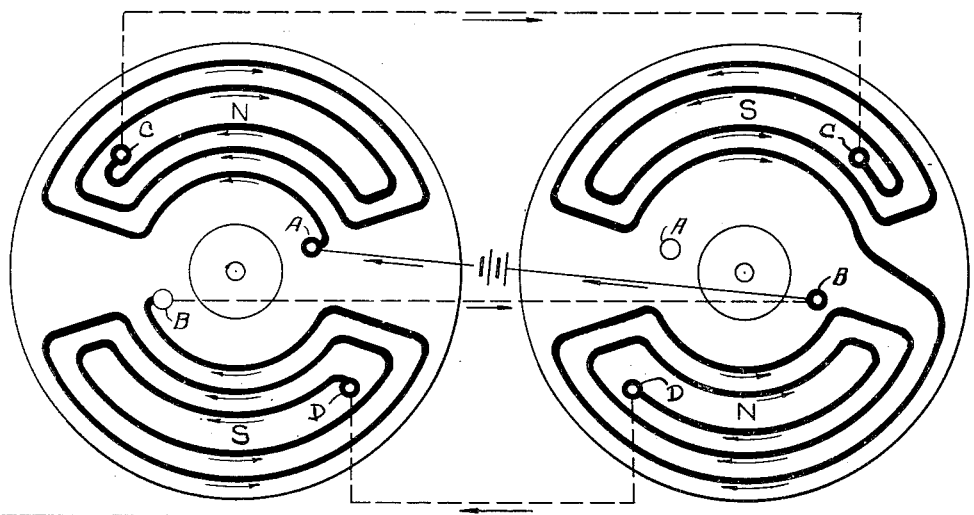
Figure 2A illustrates one face of the coated disc, with with printed coils thereon.
Figure 2B illustrates the other face of the coated disc.

Figure 1 illustrates the main principle of the invention. Two permanent magnets 1 and 2 are located on each side of a rotatable disc 3. This disc may be of the construction shown on Figures 2A and 2B, these latter figures showing opposite sides of the disc. The disc 3 may be formed of an aluminum alloy and each side carries two coils printed on it, as shown. Before printing, the disc is covered with a thin layer of insulating material, such as for example, aluminum oxide. This oxide may be applied through a well known process called anodizing, or any other suitable insulating compound may be used.

The four coils are printed in any suitable way to form printed circuits. All four are connected in series in such manner as to form two magnetic poles when fed with current. This is indicated by N for north and S for south pole on the diagrams. On the side of the disc shown on Figure 2A, the input ends of both the upper and lower coils are connected to studs A and B. These studs project thru opposite sides of the disc. The middle end of each of the coils of Figure 2A terminates at holes C and D on the disc. Through these holes the coil ends connect to the two coils on the other side of the disc (shown in Fig. 2B). It is assumed of course that the edges of the metal disc on the inside of the holes are also covered with a sleeve of insulation. A small amount of conducting compound is applied to these covered edges in such a way as to continue the circuit through the disc. This connects the coils on the two sides in series.

The two studs A and B serve to connect electricity to the four coils on the rotor. This is done through two helical hair springs, in the well known manner. When direct current passes through the coils, the magnetic poles generated by them on the disc exert a mechanical force and tend to rotate the disc so as to align the coils with the proper poles of magnets 1 and 2. There is a paper or plastic scale 29 secured to the edge of the disc by tabs 4 and 5.

The scale may run entirely around the disc for mechanical rigidity and in order to preserve mechanical balance. Alternatively it may be of any desired arc. In any case the disc is so constructed as to have a dynamic and static balance. This results in stable operation when the instrument is subject to acceleration forces, such as are present, for instance, in airplanes. The thickness of the disc is as little as is consistent with good mechanical strength, for example 0.01 inch. Due to the fact that it is made of a good conducting material, eddy currents are induced in it when moving between the magnets. This serves to damp the oscillation resulting from the mass of the disc acting with the hair springs which are used to conduct electricity to the moving coils and to bias the disc to the zero point on the scale. These hair springs are shown at 6 and 7 on Figure 4A. The mechanical construction of the instrument is shown in part by Figures 4A and 4B. Of these, Figure 4B is shown with one spring one magnet and the disc removed and Fig. 4A is a cross-section of Figure 4B at line A—A.

The hair springs 6 and 7 are each connected at one end to one of the studs in the disc and the other end of spring 6 is fastened to a stud located on metal washer 8. This washer is rotatably fastened to frame 9 by eyelet 10. There are however insulating members 11 between the washers on each side of frame 9 and the frame itself. Electrical connection is made to washer 8. The figure does not show the input electrical connection to hair spring 7 but it is to be understood that this is similar to the connection leading to spring 6. This is so with all the other details shown only on one side of the disc 13. Figure 4B shows mainly the magnet faces, the rotating disc 13 being removed to enable this showing. Washer 8 has an arm 14 projecting outward in order to enable the washer to be adjusted manually. This adjustment need only be one quarter of a revolution or less and has for its purpose the adjusting of the tension in the hair spring. Through this adjustment, the reading may be set to zero when no current is flowing. Hence arm 14 may be regarded as a conventional zero adjuster.

The disc is permitted to assume such position, under strong current conditions, that its poles line up directly with the magnets. In this way the need for a stop to limit the motion is eliminated. This fact, together with the comparatively high moment of inertia of the disc, makes it impossible to mechanically damage the instrument with excessive current. The only damage possible, in fact, is the melting of the hair springs or the coils, and these can be protected by fusers. Conventional instruments act too fast and are so delicate that a fuse usually doesn't act fast enough to protect them.

Figure 5:
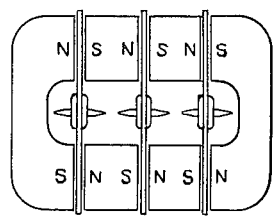
Figure 5 illustrates how a number of my instruments may be located adjacent each other to provide a number of indications of different electrical values.

When using several of the instruments described above alongside of one another, a saving in space may be effected with the distribution of components shown, in general configuration, on Fig. 5. This construction effects an economy in the use of the magnets, by placing their fields in series with one another. The underlying principle of such construction is described in my U. S. Patent No. 2,479,589 and therefore no detailed explanation is given here. Such construction is especially useful on airplane dashboards where twenty or more instruments are used simultaneously. At present, in such installations each instrument occupies about three inches square. When using the above system, an area of one inch by three inches is used by each instrument, and the length of the scale can be increased at will by increasing the disc diameter. The window on the panel need not however be increased above the one by three inches. With the moving scale construction as described, longer and wider scales are possible in a given space than with any other construction.

On Fig. 5 only three discs are shown, but obviously in similar manner any larger number is possible. The discs may also be made of some non-conducting material, such as Celluloid, if a damped motion is not important. Air vanes on the scale on the back of the instrument where they are not visible, can help reduce the time of oscillation.

The construction making use of printed coils is inexpensive and accurate. However the number of turns is limited. To increase this, ordinary helical coils may be cemented onto the aluminum or iron disc although, of course, this would be at the cost of increasing the magnetic gap. Moreover, it is possible to build up successive layers of coils by having layers of insulating coating material each having a printed coil thereon.

Figure 6:
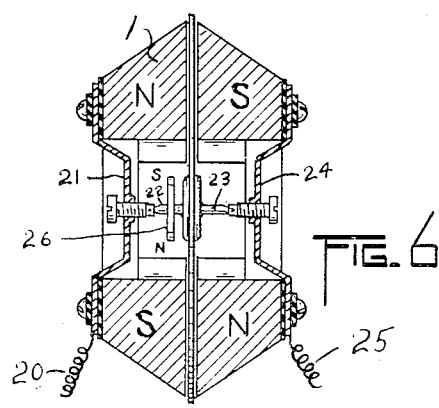
Figure 6 illustrates a modified form of the instrument which avoids the use of hairsprings.
Figure 3:
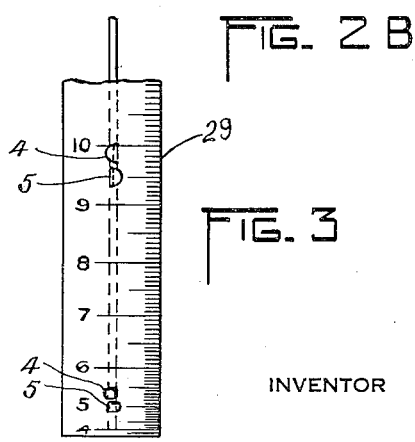
Figure 3 is a plan view of the scale and pointer of the instrument.

Figure 6 illustrates a modified form of the invention in which there are no hairsprings. Current is fed into input terminal 20 which is connected to bracket 21. Current then passes through shaft 22 to one end of the printed coil. After flowing through the coil the current passes through shaft 23 and thence to bracket 24 and terminal 25. Instead of employing hair springs to bias the disc, a magnet 26 is mounted on shaft 22. The poles on magnet 26 tend to move the disc until the south pole S of magnet 26 is closest to the north pole N of magnet 1. When current flows through the moving coils the disc tends to rotate and the motion is restrained by the magnetic pull between magnets 1 and 26.

While I have illustrated this instrument as a direct current one having permanent magnets 1 and 2, if the stationary poles were made of soft iron there would be some torque produced by current flow through the coils. Such an instrument would also measure alternating current.

Moreover, magnets 1 and 2 could be replaced by stationary coils through which the current to be measured is passed. This too would result in an instrument capable of measuring either alternating or direct current.

The broader aspects of this invention are not limited to measuring instruments but are applicable to other forms of torque producing electrical devices, such as for example relays or very low power motors.

I claim:

1. An electrical measuring instrument comprising a disc of conducting material, two coils mounted on one face of the disc with their centers on a common diameter and said centers being on opposite sides of the center of the disc, two coils mounted on the other side of the disc respectively substantially coaxial with two coils on the first side of the disc, said disc being metallic and having the surfaces of both of its faces composed of an insulating compound that includes part of the metal of the disc and is bonded to the metal of the disc and the coils being lines of conducting material on the surface of the insulating compound, means connecting said coils in series with the fields of complementary coaxial coils additive and the fields of coils on opposite sides of the center of the disc being in opposite directions, means for biasing the disc to zero position, U-shaped magnet means on each side of said disc for producing magnetic flux through the disc parallel to the axis thereof with increasing field strength along the path of rotation of the coils, said magnet means producing flux in one direction through the coils on one side of the center of the disc and in the opposite direction through the coils on the other side of the center of the disc, and means for indicating the rotary position of the disc.

2. An electrical measuring instrument as defined in claim 1 in which said U-shaped magnet means are permanent magnets having their respective legs adjacent the periphery of said disc and facing the disc at points along the path of movement of the coils displaced from the center of the coils when the disc is at the zero position.

3. An electrical measuring instrument as defined in claim 2 in which the means for biasing the disc comprises two hairsprings respectively on opposite sides of the disc and feeding the current to be measured to the coils.

4. An electrical measuring instrument as defined in claim 1 in which the means for producing the magnetic flux is a permanent magnet and in which the means for biasing the disc is a second magnet cooperating with the first one, said second magnet solidly fastened to the rotating axis.

5. An electrical measuring instrument comprising a rotatably mounted disc of conductive material, an insulating coating deposited on each face of said disc, a plurality of printed circuit coils on said insulating coatings, coils on opposite faces of said disc being interconnected through said disc, said coils being arranged to provide magnetic poles of both a first and second polarity on each side of said disc when a unidirectional current is passed through the interconnected coils, said magnetic poles of said first polarity being diagonally disposed on opposite sides of said disc, and said magnetic poles of said second polarity being further diagonally disposed on opposite sides of said disc, two U-shaped magnets respectively disposed on opposite sides of said disc with their respective poles adjacent the periphery of said disc and in flux aiding relation to one another, means for biasing the disc to a zero position, and means coupled to said disc for indicating the angular position thereof.

6. In an instrument responsive to electric current, a coil of conducting material, a metallic supporting member therefor, said supporting member being rotatable on its axis and extending outward therefrom, at least one face of the metallic member having an additional element combined with the metal of the face to form a surface which is an insulating compound, said coil being disposed upon said surface of said supporting member and being in the form of a coating of conducting material bonded throughout its entire length to said surface of the supporting member, means for passing said electric current through the coil, and means for providing magnetic flux which passes through said coil in a direction substantially parallel to said axis.

7. In an instrument responsive to electric current, a rotatable disc shaped metallic supporting member of conductive material having two outer faces, the surface of each of said faces being a layer of insulating material which is a compound that includes part of the metal of the disc shaped metallic member, a line of conducting material in the form of a printed circuit having the configuration of a coil secured to the surface of each of said faces, means for providing magnetic flux which links the coil when current flows through the coil, a connection between said lines of conducting material on the surfaces of the opposite faces of said supporting member, means for passing said electric current through the coils, and means for biasing the coil so that the extent of its rotation depends upon the torque developed as a result of the interaction of said flux with the current flowing through the coil.

8. In an instrument responsive to electric current, an aluminum supporting member mounted for rotary motion and having two faces, said faces having anodized surfaces whereby there is a layer of aluminum oxide on both faces thereof, a printed line of conducting material having the configuration of a coil secured to the anodized surfaces of each of said faces, a connection between said lines of conducting material on opposite faces of said supporting member, said connection being insulated from said supporting member, means for passing magnetic flux through the member substantially parallel to the axis of rotation, and means for passing said electric current through the coils to rotate said member.

9. In an instrument responsive to electric current, a supporting member of conductive material rotatable on an axis and extending transverse thereto, said member having two faces each of which has attached to its surface a layer of insulating material, a coating secured to the outside surface of each of said layers and forming a line of conductive material with each coating having the configuration of a coil, said coils being displaced from said axis, means for biasing said member to a starting position, a connection between said lines of conducting material on opposite faces of said supporting member, means for passing the electric current through the coils, and means for passing magnetic flux through the member to attract the coils when current flows therethrough.

10. An instrument as defined in claim 9 in which there is a first coil and a second coil on each face of the member, the two first coils being connected to provide additive fluxes parallel to said axis in one direction and the two second coils being connected to provide additive fluxes parallel to said axis in a direction opposite to the fluxes of the first coils, the first and second coils on each face being spaced from said axis and from each other, said field producing means establishing two fields one of which attracts said first coils and the other of which attracts said second coils.

11. In an instrument responsive to electric current, a plurality of parallel metallic discs having a common axis and the discs having substantially the same diameters, means mounting the discs for rotation independently of each other about said axis, two coils respectively printed on the two faces of each of the discs and insulated therefrom, an electric circuit for the coils of each disc for energizing the coils, field producing means that passes the same magnetic flux through all of said discs along a line parallel to said common axis, and means on the periphery of each disc for indicating the angular position thereof.

12. An instrument as defined in claim 11 in which the field producing means includes a U-shaped magnet having its poles respectively facing different portions of one of the end discs which portions are respectively near opposite ends of a common diameter.

13. An instrument as defined in claim 12 having a second U-shaped magnet cooperating with the other end disc to provide a magnetic field additive to that of the first magnet.

14. An instrument as defined in claim 13 having magnetic material between the discs in line with the poles of the magnets to improve the flux path through the instrument.

15. An instrument as defined in claim 11 in which the field-producing means includes a U-shaped magnet having its poles respectively facing different portions of one of the end discs near the periphery, which portions are respectively near opposite ends of a common diameter of the disc, a second U-shaped magnet cooperating with the other end disc to provide a magnetic field additive to that of the first magnet, and additional magnets between the disc and in line with poles of the two U-shaped magnets for providing additional magnetomotive force for the instrument.

16. An instrument as defined in claim 15 in which there is one of said additional magnets in each air gap between discs through which flux passes.

17. In an instrument responsive to electric current, a metallic supporting member mounted for rotation about an axis and having portions radially removed from said axis, the surface of said portions having been altered to render it a non-conductor, a printed circuit on said non-conducting surface and having the configuration of a coil as well as being displaced from said axis, means for passing an electric current through the coil, means for biasing the member to a starting position, and means for establishing a magnetic field through the member which is out of alignment with the field of said coil whereby when current flows through the coil a torque is exerted on the member tending to bring the two fields into alignment.

18. An instrument as defined in claim 9 including means comprising a graduated scale cooperating with said member for indicating the angular position of the latter.

References Cited in the file of this patent

UNITED STATES PATENTS

| | | |
|---|---|---|
| 701,937 | Robinson | June 10, 1902 |
| 800,873 | Northrup | Oct. 3, 1905 |
| 835,322 | Pratt | Nov. 6, 1906 |
| 1,563,731 | Ducas | Dec. 1, 1925 |
| 1,647,474 | Seymour | Nov. 1, 1927 |
| 2,427,571 | Pattee | Sept. 16, 1947 |
| 2,474,988 | Sargrove | July 5, 1949 |
| 2,611,010 | Sass | Sept. 16, 1952 |